United States Patent [19]

Yach

[11] Patent Number: 6,055,211

[45] Date of Patent: Apr. 25, 2000

[54] FORCE PAGE ZERO PAGING SCHEME FOR MICROCONTROLLERS USING DATA RANDOM ACCESS MEMORY

[75] Inventor: Randy L. Yach, Phoenix, Ariz.

[73] Assignee: Microchip Technology Incorporated, Chandler, Ariz.

[21] Appl. No.: 08/887,876

[22] Filed: Jul. 3, 1997

[51] Int. Cl.[7] ...................................... G11C 8/00
[52] U.S. Cl. ...................................... 365/238.5; 365/239
[58] Field of Search ................... 365/238.5, 235, 365/239, 240; 395/800.01, 800.32, 800.33

[56] References Cited

U.S. PATENT DOCUMENTS

| | | | |
|---|---|---|---|
| 5,255,382 | 10/1993 | Pawloski | 395/425 |
| 5,809,327 | 9/1998 | Wollan et al. | 395/800.33 |
| 5,887,189 | 3/1999 | Birns et al. | 395/800.32 |

*Primary Examiner*—David Nelms
*Assistant Examiner*—David Lam
*Attorney, Agent, or Firm*—Ronald L. Chichester; Paul N. Katz; Frohwitter

[57] ABSTRACT

A microcontroller architecture that adds a dedicated bit in the op-code decode field to force data access to take place on page 0 of the random access memory (RAM) for that instruction. This allows the user to have any page selected and still have direct access to the special function registers or the register variables which are located on page 0 of the RAM. The setting of the dedicated bit will not affect the current operation of the microcontroller nor will the setting of the bit modify the currently selected address stored in the op-code instruction currently being executed by the microcontroller.

13 Claims, 2 Drawing Sheets

FORCE PAGE ZERO PAGING SCHEME FOR MICROCONTROLLERS USING DATA RANDOM ACCESS MEMORY

BACKGROUND OF THE INVENTION

1. Field of the Invention

This invention relates generally to microcontrollers and, more specifically, to a random access memory paging scheme for a microcontroller which will allow a user to have any page selected in the random access memory of the microcontroller and still have direct access to special function registers or the register variables without modifying the page select register of a current instruction.

2. Description of the Prior Art

Current microcontrollers, including PIC microcontrollers, use a random access memory (RAM) paging scheme to address all the data memory. This scheme is extremely cumbersome in that it takes several instructions to make sure the user is writing or reading the proper address in the RAM. It also complicates the job of the C-compiler since the C-compiler must keep track of which page is currently selected in the RAM. This presents even more problems when handling interrupts.

In classic microcontroller architecture, the above problem would be solved by increasing the op-code field to handle larger addresses. However, increasing the op-code field has the disadvantage of increasing the size of the microcontroller and thus increasing the overall cost of the microcontroller. Another way to alleviate the RAM paging problem is to map all special function and register dedicated memory space that is available in every bank or page. This waste precious RAM space since every location that is mapped takes up one general purpose RAM location in every bank. If the micro has eight (8) pages, seven (7) locations of RAM are wasted.

Therefore, a need existed to provide an improved microcontroller architecture and paging scheme. The improved microcontroller architecture and paging scheme must allow for direct access to special function registers. The improved microcontroller architecture and paging scheme must allow direct access to special function registers without modifying the page select register of the current instruction being executed by the microcontroller. The improved microcontroller architecture and paging scheme must further allow for direct access to special function registers without increasing the size of the microcontroller.

SUMMARY OF THE INVENTION

In accordance with one embodiment of the present invention, it is an object of the present invention to provide an improved microcontroller architecture and paging scheme.

It is another object of the present invention to provide an improved microcontroller architecture and paging scheme that allows direct access to special function registers without modifying the page select register of the current instruction being executed by the microcontroller.

It is still another object of the present invention to provide an improved microcontroller architecture and paging scheme that allows direct access to special function registers without increasing the size of the microcontroller.

BRIEF DESCRIPTION OF THE PREFERRED EMBODIMENTS

In accordance with one embodiment of the present invention, a paging scheme for a microcontroller that uses data random access memory to allow tracking of a currently selected address in the random access memory. The method comprises the step of dedicating a bit in each op-code instruction of the microcontroller. When the bit is set, the bit forces data access to take place on a section of the random access memory storing special and general purpose registers while not affecting current operations of the microcontroller. Even when set, the dedicated bit will not modify the currently selected address stored in the op-code instruction currently being executed by the microcontroller. The method may further comprise the steps of: linearizing an entire address range of the random access memory; and dedicating a first address section of the random access memory to the special and general purpose registers.

In accordance with another embodiment of the present invention, a microcontroller having force page zero architecture is disclosed. The microcontroller has a random access memory that has an entire linearized address range. The random access memory is divided into a plurality of pages wherein the first page is dedicated to special and general purpose registers. A dedicated bit in each op-code instruction of the microcontroller is used to force data access to take place on the first page of the random access memory which stores the special and general purpose registers. The setting of the dedicated bit will not affect the current operations of the microcontroller nor will the setting of the bit modify the currently selected address stored in the op-code instruction currently being executed by the microcontroller.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
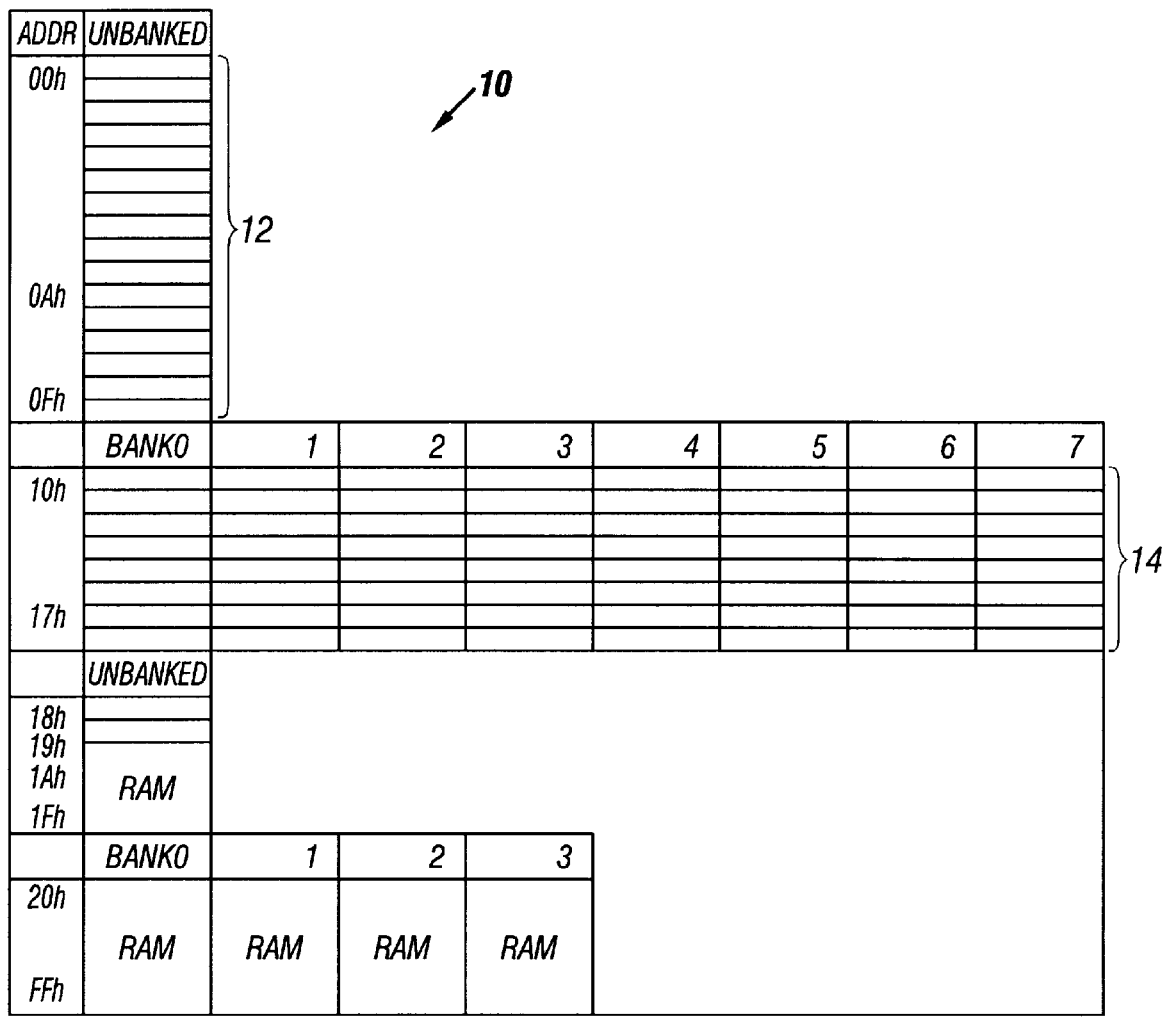
FIG. 1 is a simplified block diagram of a prior art paging scheme for a microcontroller to address data memory.

Referring to FIG. 1, a simplified block diagram of a prior art paging scheme 10 for a microcontroller to address data memory is shown. As stated above, all special function and register variables 12 are mapped in the first page of the RAM. However, since the special function registers 12 have to be accessible all the time, the special function registers 12 are mapped into every bank (i.e., Bank 1-7). This waste precious RAM space since every location that is mapped takes up one general purpose RAM location.

Figure 2:
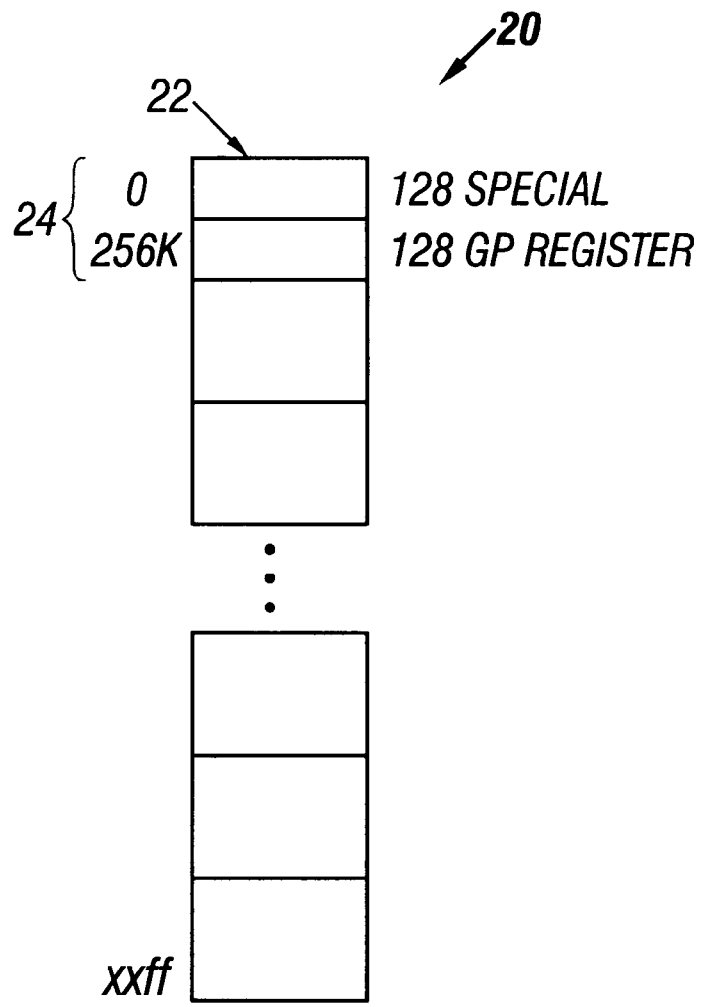
FIG. 2 is a simplified block diagram of a microcontroller having a force page zero paging scheme.

Referring to FIG. 2, a microcontroller 20 with force page 0 architecture is shown. The microcontroller 20 uses a random access memory (RAM) 22 for storing data. The size of the RAM 22 is based on the particular use of the microcontroller 20. As can be seen from FIG. 2, the entire address range of the RAM 22 is linearized. By linearizing the address range, the problems associated with banking and page bits of the prior art are removed.

However, in general, many of the op code instructions of the microcontroller 20 are limited in address space. In the preferred embodiment of the present invention, the microcontroller 20 is an 8-bit PIC microcontroller. Thus, many of the op-code instructions of the microcontroller 20 are limited to an 8-bit address. For this reason, the linear address range is broken into a plurality of pages. If the microcontroller 20 is an 8-bit microcontroller, the RAM 22 is divided into a plurality of 256K byte pages.

The first page 24 (i.e., page 0) is used for storing the special function registers 12 (FIG. 1) and general purpose registers 14 (FIG. 1). As stated above, these registers 12 and 14 need to be accessible at all times. This is required because if an interrupt is called and the user wants to use an interrupt service routine, the user has to deal with the special function and general purpose registers 12 and 14 which are stored on the first page 24. In the preferred embodiment of the present invention, the first page 24 is broken into two 128K byte sections. The first 128K section stores the special function registers while the second 128K section stores the general purpose registers.

Figure 3:
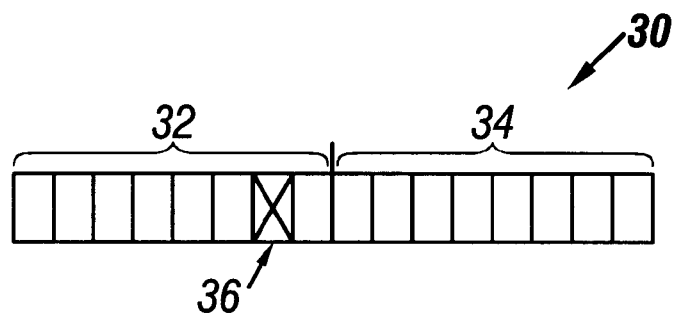
FIG. 3 is a simplified block diagram of an op-code instruction.

Referring now to FIGS. 2 and 3, in order to have the special and general purpose registers 12 and 14 accessible at all times, a bit 36 is dedicated in each op-code instruction 30 of the microcontroller 20 which when set forces data access to take place on the first page 24 (i.e., page 0) of the RAM 22. The setting of the dedicated bit does not affect the current operation of the microcontroller 20 nor does it modify the currently selected address stored in an op-code instruction currently being executed by the microcontroller 20. Thus, no matter where the user is in the RAM 22, if the bit 36 is set, the current instruction will always affect the first page (i.e., page 0) which stores the special and general purpose registers 12 and 14. Thus, if a user is in the general purpose RAM area (i.e., any page except the first page, page 0) and receives an interrupt, the interrupt service routine can set the dedicated bit 36 in the op-code instruction 30. The user may then deal with the special and general purpose registers 12 and 14 without affecting anything else the microcontroller 20 was doing. When the interrupt has been properly serviced, the microcontroller 20 may go back to the current address location in the RAM 22 since the address location was not modified during the service of the interrupt.

In the preferred embodiment of the present invention for an 8-bit microcontroller 20, the op-code instruction 30 is a 16-bit instruction. The first 8-bits section 32 define the instruction and tells the microcontroller 20 what to do. The second 8-bits section 34 defines the address where the instruction is to be executed. The dedicated bit 36 is added to the first 8-bit section 32 of the op-code instruction 30 in order not to alter the address stored in an op-code instruction 30 when the dedicated bit 36 is set.

In the preferred embodiment of the present invention, the dedicated bit 36 is only added to numeric processing op-code instructions of the microcontroller 20. By removing a few non-numeric processing op code instructions from the instruction decode map of the microcontroller 20, the dedicated bit 36 may be added in the numeric processing op-code instructions of the microcontroller 20 without increasing the size of the instruction decode map of the microcontroller 20.

While the invention has been particularly shown and described with reference to preferred embodiments thereof, it will be understood by those skilled in the art that the foregoing and other changes in form, and details may be made therein without departing from the spirit and scope of the invention.

I claim:

1. A paging scheme for a microcontroller that uses data random access memory to allow tracking of a currently selected address in said random access memory comprising the steps of:

dedicating a bit in each op-code instruction of said microcontroller which when set forces data access to take place on a section of said random access memory;

storing special and general purpose registers while not affecting current operations of said microcontroller; and not modifying said currently selected address stored in an op-code instruction being executed by said microcontroller.

2. A paging scheme for a microcontroller in accordance with claim 1 further comprising the steps of:

linearizing an entire address range of said random access memory; and dedicating a first address section of said random access memory to special and general purpose registers.

3. A paging scheme for a microcontroller in accordance with claim 2 wherein said step of linearizing an entire address range of said random access memory further comprises the step of dividing said linearized address range of said random access memory into a plurality of pages.

4. A paging scheme for a microcontroller in accordance with claim 3 wherein said step of dividing said linearized address range of said random access memory into a plurality of pages further comprises the step of dividing said linearized address range of said random access memory into a plurality of pages wherein each of said plurality of pages is 256K in size.

5. A paging scheme for a microcontroller in accordance with claim 2 wherein said step of dedicating a bit in each op-code instruction of said microcontroller further comprises the step of dedicating a bit in only numeric processing op-code instructions of said microcontroller.

6. A paging scheme for a microcontroller in accordance with claim 5 wherein said step of dedicating a bit in only numeric processing op-code instructions of said microcontroller further comprises the step of removing non-numeric processing op code instructions from an instruction decode map of said microcontroller to allow adding said dedicated bit in only said numeric processing op-code instructions of said microcontroller without increasing a size of said instruction decode map for said microcontroller.

7. A paging scheme for a microcontroller that uses data random access memory to allow tracking of a currently selected address in said random access memory comprising the steps of:

linearizing an entire address range of said random access memory;

dividing said linearized address range of said random access memory into a plurality of pages;

dedicating a first page of said random access memory to special and general purpose registers; and dedicating a bit in each op-code instruction of said microcontroller which when set forces data access to take place on a section of said random access memory storing special and general purpose registers while not affecting current operations of said microcontroller and not modifying said currently selected address stored in an op-code instruction being executed by said microcontroller.

8. A paging scheme for a microcontroller in accordance with claim 7 wherein said step of dividing said linearized address range of said random access memory into a plurality of pages further comprises the step of dividing said linearized address range of said random access memory into a plurality of pages wherein each of said plurality of pages is 256K in size.

9. A paging scheme for a microcontroller in accordance with claim 7 wherein said step of dedicating a bit in each op-code instruction of said microcontroller further comprises the step of dedicating a bit in only numeric processing op-code instructions of said microcontroller.

10. A paging scheme for a microcontroller in accordance with claim 9 wherein said step of dedicating a bit in only numeric processing op-code instructions of said microcontroller further comprises the step of removing non-numeric processing op code instructions from an instruction decode map to allow adding said dedicated bit in only said numeric processing op-code instructions of said microcontroller without increasing a size of an instruction decode map of said microcontroller.

11. A microcontroller having force page zero architecture comprising, in combination:

random access memory having an entire linearized address range wherein said random access memory is divided into a plurality of pages, said random access memory dedicating a first page to special and general purpose registers; and a dedicated bit in each op-code instruction of said microcontroller which when set forces data access to take place on said first page of said random access memory storing said special and general purpose registers while not affecting current operations of said microcontroller and not modifying a currently selected address stored in an op-code instruction being executed by said microcontroller.

12. A microcontroller having force page zero architecture in accordance with claim 11 wherein each of said plurality of pages of said random access memory is 256K in size.

13. A microcontroller having force page zero architecture in accordance with claim 11 wherein said dedicated bit is placed only in numeric processing op-code instructions of said microcontroller.

* * * * *